ately Nov. 9, 1943

2,334,096

UNITED STATES PATENT OFFICE 2,334,096

AIR-DRYING WATER PAINT

Arthur M. Howald and Maurice H. Bigelow, Toledo, Ohio, assignors, by mesne assignments, to Libbey-Owens-Ford Glass Company, a corporation of Ohio No Drawing. Application July 3, 1940, Serial No. 343,818

2 Claims. (Cl. 260—29)

The invention relates to a quick-drying water paint containing a formaldehyde-urea reaction product, and particularly to a water paint for interior decorating that becomes insoluble after being applied, to produce a washable coating.

The paints used at present for interior decorating are made up of pigment, a drying oil and an organic solvent or thinner, such as turpentine. Two important disadvantages of such paints are, first, that they take twenty-four hours or more to become entirely dry to the touch, and, second, that the disagreeable odor of the organic solvent or thinner persists for many days after the paint has been applied. Many apartments in which the average tenancy is about one year are redecorated after being vacated by each tenant. The odor of the thinner used in present interior paints is so persistent that an apartment is not habitable until about two weeks after it has been painted, so that there is a loss of two weeks' rent after each tenancy.

Ordinary calcimine is a water paint, but it cannot be utilized for interior decorating, because it rubs off when touched, and is washed off by cold water.

The principal object of the invention is to provide a water paint that does not leave an odor, is dry to the touch immediately after being applied, and rapidly becomes insoluble, to form a washable coating that cannot be rubbed off. More specific objects and advantages are apparent from the description, which merely discloses and illustrates the invention and is not intended to impose limitations upon the claims.

A washable coating can be produced in accordance with the invention by preparing a suspension of pigment in an aqueous solution of a formaldehyde-urea reaction product, and applying the resulting composition as a surface coating, together with a hardening agent. Preferably, a uniform, fine dispersion of the pigment in a solution of a formaldehyde-urea reaction product is prepared by means of a dispersing apparatus, such as a ball mill, roller mill, or colloid mill. In order to prepare a solid product that forms a self-hardening coating composition when brought together with water and a hardening agent, the resulting dispersion of the pigment in the solution of formaldehyde-urea reaction product may be evaporated in any desired apparatus, such as a spray-drier or vacuum drum drier. The addition of water to the solid product thus obtained produces a dispersion of the pigment in an aqueous solution of the formaldehyde-urea reaction product.

Since water can be added more readily to a paste than to a solid product, the composition is preferably shipped or sold in the form of a water-color paste comprising a dispersion of pigment in a solution of a formaldehyde-urea reaction product, which paste is capable of dilution with water to form a coating composition that can be applied, together with a hardening agent, to produce a washable coating. A paste of the proper consistency can be obtained directly from a dispersing apparatus, if a solution of the proper concentration is introduced into the dispersing apparatus, together with the pigment.

A water-color paste may consist simply of pigment, water, and a water-soluble formaldehyde-urea reaction product, the pigment being in the form of a fine dispersion in the aqueous solution of the formaldehyde-urea reaction product. The aqueous solution of the formaldehyde-urea reaction product in such a paste may be diluted, if desired, with a volatile water-soluble organic solvent, such as cellosolve, ethylene glycol monomethyl ether, ethanol, and other alcohols of low molecular weight, the preferred organic diluent being methanol.

Such an organic diluent helps to stabilize the formaldehyde-urea reaction product, and prevents the paste from freezing when subjected to low temperatures. Moreover, a diluent such as methanol lengthens the period of stability or liquid life of the composition after the addition of the hardening agent. Then, after the composition has been applied, the methanol quickly evaporates, so that the stabilizing effect of the methanol is no longer present, and the coating rapidly becomes insoluble and washable.

When an organic diluent is used in the paste, it is preferable to use only enough water to dissolve the formaldehyde-urea reaction product, and then to add enough of the organic diluent to produce a paste of the desired consistency. However, any smaller proportion of organic diluent may be employed in the paste, and a very small amount of organic diluent may be employed if desired. The proportion of any given organic diluent should not be greater than that which is soluble in the amount of water present in the paste.

In order to prepare a coating composition, a large amount of paste containing a white pigment is ordinarily mixed with a small amount of paste containing a colored pigment. The mixed paste is then diluted with water, to prepare a coating composition that is thin enough to suit the method of application, such as brushing or spraying.

A plasticizer such as ethylene glycol may be used in a coating composition embodying the invention.

The amount of pigment used in a coating composition embodying the invention depends upon whether a glossy finish or a flat finish is desired. A glossy finish can be obtained by the use of approximately equal parts by weight of pigment and formaldehyde-urea reaction product, and a flat finish can be obtained by the use of from two to six parts by weight of pigment for each part of formaldehyde-urea reaction product.

The hardening agent is a substance that renders the coating composition acid, and thus causes it to harden, i. e., become insoluble, upon being applied. After the hardening agent has been added, the composition must be applied before hardening takes place.

The preferred hardening agent is an acid ammonium salt, such as ammonium chloride or ammonium bromide. Such an ammonium salt is advantageous because a coating composition embodying the invention, to which an acid ammonium salt has been added, gradually becomes more and more acid. Ammonium chloride, for example, gradually "extracts" some formaldehyde from the formaldehyde-urea reaction product. The reaction of such formaldehyde with ammonium chloride produces hexamethylenetetramine hydrochloride, which is much more acid than ammonium chloride. After an acid ammonium salt has been added to the coating composition, the composition is not very acid at first, and therefore has a relatively long "liquid life." However, since the composition becomes more and more acid by conversion of the ammonium salt into a hexamethylenetetramine salt, the hardening accelerates after the coating has been applied, so that the coating becomes washable after a relatively short period of time. The quantity of hardening agent used is simply an amount sufficient to cause the hardening to take place with the desired rapidity.

Although it is preferable to dissolve the hardening agent in the aqueous coating composition just prior to application of the composition, the hardening agent can be used in other ways. For example, a solution of the hardening agent can be painted on the surface to be coated before the coating composition is applied.

A water paint embodying the invention dries rapidly, and is dry to the touch about one hour after it is applied. If the composition contains an organic dilutent, it may be of a highly volatile character, so that the odor of the organic dilutent can only be detected during the first hour, while the coating is drying.

The water-soluble formaldehyde-urea reaction product is most readily obtained by reacting formaldehyde and urea in an aqueous solution. If the reaction is carried too far, the formaldehyde-urea reaction product will precipitate upon dilution of the resulting solution. In any water-color paint embodying the invention that is to be diluted with water, a formaldehyde-urea reaction product should be employed that will not precipitate upon the addition of sufficient water to permit the composition to be applied.

A water-soluble formaldehyde-urea reaction product for use in a composition embodying the invention may be prepared as follows: 1 mol of urea is added to a 37 per cent aqueous solution containing 2 mols of formaldehyde that has been brought to pH 4.5-5.5 by means of sodium hydroxide. The solution is then gently refluxed long enough (about 1 hour) to carry the formaldehyde-urea reaction to the desired stage, after which the solution is neutralized. It may then be diluted with water, or evaporated under vacuum to the desired concentration.

The aqueous solution of the formaldehyde-urea reaction product, together with the desired amount of pigment, is preferably treated by means of a dispersing apparatus to produce a uniform dispersion of the pigment. The resulting dispersion may be in the form of a paste, or may be of the proper consistency to be used directly as a coating composition. It may also be evaporated to produce a water paint in solid form. It is preferable to reduce such a solid to a powder, in order that the formaldehyde-urea reaction product may dissolve rapidly when water is added.

*Example 1*

An aqueous solution is prepared in accordance with the foregoing procedure containing 300 parts by weight of a formaldehyde-urea reaction product and just sufficient water to dissolve it. To this solution is added 300 parts of zinc sulphide pigment, and sufficient methanol to form a paste of the desired consistency. The resulting paste remains stable for two years or more. If the paste contains 280 parts by weight of methanol, a water paint of heavy brushing consistency can be obtained by adding 3 parts of ammonium chloride and sufficient water to bring the total amount of water in the paint up to 140 parts. This water paint has a "liquid life" of four days at 90° F. When it is painted on a surface and allowed to dry, the coating is insoluble in water after seven days.

If 15 parts of ammonium oxalate are used instead of 3 parts of ammonium chloride in this paint, the liquid life is five days at 90° F., and a coating of the paint is insoluble in water after fourteen days.

The odor of methanol as this paint is being applied is very slight, and quickly disappears. No other odor can be noticed.

*Example 2*

An aqueous solution containing 2500 parts of a formaldehyde-urea reaction product is prepared in accordance with the foregoing procedure, and a roller mill is used to disperse 2500 parts of titanium oxide pigment in the solution. After the addition of 10 parts of ethylene glycol as a plasticizer, the resulting dispersion is evaporated in a spray-drier, and the resulting spray-dried product is mixed with 120 parts of calcium phosphate, as a "conditioner" to prevent lumping, and 100 parts of urea. A water paint can be prepared from this dry mixture by adding 25 parts of ammonium acetate, 75 parts of ammonium chloride and 100 parts of zinc sulphate as hardening agents, and sufficient water to yield the proper consistency for application.

*Example 3*

An aqueous solution containing 2000 parts of a formaldehyde-urea reaction product is prepared in accordance with the foregoing procedure, and a roller mill is used to disperse 2500 parts of titanium oxide pigment and 500 parts of starch in the solution. After the addition of 10 parts of ethylene glycol as a plasticizer, the resulting dispersion is evaporated in a spray-drier, and the resulting spray-dried product is mixed with 120 parts of calcium phosphate, as a "conditioner" to prevent lumping, and 75 parts of urea. A water paint can be prepared from this dry mixture by adding the additional ingredients used in Example 2.

Various embodiments of the invention may be devised to meet various requirements.

Having described our invention, we claim:

1. A method of preparing a coating composition that comprises preparing a dispersion of a pigment in a substantially neutral solution of a formaldehyde-urea reaction product by means of a dispersing apparatus, evaporating the resulting dispersion to produce a solid product, and bringing said product together with water and a hardening agent capable of acidifying the formaldehyde-urea reaction product to form a self-hardening coating composition comprising a dispersion of the pigment in a solution of the formaldehyde-urea reaction product.

2. A method of preparing a coating composition that comprises preparing a dispersion of a pigment in a substantially neutral aqueous solution of a formaldehyde-urea reaction product by means of a dispersing apparatus, and spray-drying the resulting dispersion to produce a solid product, and bringing said product together with water and a hardening agent capable of acidifying the formaldehyde-urea reaction product, to form a self-hardening coating composition comprising a dispersion of the pigment in a solution of the formaldehyde-urea reaction product.

ARTHUR M. HOWALD.
MAURICE H. BIGELOW.